United States Patent
Hellstrom et al.

(10) Patent No.: US 10,920,690 B2
(45) Date of Patent: Feb. 16, 2021

(54) METHOD AND SYSTEM FOR PROVIDING BOOST TO AN INTERNAL COMBUSTION ENGINE

(71) Applicant: Ford Global Technologies, LLC, Dearborn, MI (US)

(72) Inventors: John Erik Mikael Hellstrom, Ann Arbor, MI (US); Mrdjan Jankovic, Birmingham, MI (US); Mario Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 15/899,812

(22) Filed: Feb. 20, 2018

(65) Prior Publication Data

US 2019/0257255 A1 Aug. 22, 2019

(51) Int. Cl.
| | | |
|---|---|---|
| *F02D 41/00* | (2006.01) | |
| *F02D 41/24* | (2006.01) | |
| *F02B 37/18* | (2006.01) | |
| *B60W 50/00* | (2006.01) | |

(52) U.S. Cl.
CPC ..... *F02D 41/0007* (2013.01); *B60W 50/0097* (2013.01); *F02B 37/18* (2013.01); *F02D 41/2451* (2013.01); *B60W 2420/42* (2013.01); *B60W 2420/52* (2013.01); *B60W 2540/10* (2013.01); *B60W 2552/00* (2020.02); *B60W 2554/801* (2020.02); *B60W 2554/804* (2020.02); *B60W 2555/60* (2020.02); *F02D 2200/0406* (2013.01); *F02D 2200/501* (2013.01); *F02D 2200/602* (2013.01); *F02D 2200/702* (2013.01)

(58) Field of Classification Search
None
See application file for complete search history.

(56) References Cited

U.S. PATENT DOCUMENTS

| | | | |
|---|---|---|---|
| 6,314,733 B1 | 11/2001 | Fallahi et al. | |
| 8,241,177 B2 | 8/2012 | Doering et al. | |
| 9,399,959 B2* | 7/2016 | Whitney | F02D 41/222 |
| 9,630,611 B1 | 4/2017 | Dufford | |
| 10,300,919 B2* | 5/2019 | Redbrandt | B60W 50/06 |
| 2009/0118972 A1* | 5/2009 | Baur | B60K 6/48 |
| | | | 701/102 |
| 2011/0144876 A1* | 6/2011 | Miah | B60W 10/06 |
| | | | 701/70 |

(Continued)

FOREIGN PATENT DOCUMENTS

DE 102017216380 A1 * 3/2019 ............ B60W 10/06

OTHER PUBLICATIONS

Gottwald, Frank, Sep. 15, 2017, Machine translation of DE-102017216380-A1, 15 pages (Year: 2017).*

*Primary Examiner* — Dale W Hilgendorf
*Assistant Examiner* — Alexander C. Bost
(74) *Attorney, Agent, or Firm* — Geoffrey Brumbaugh McCoy Russell LLP

(57) ABSTRACT

A method for adjusting boost provided via a turbocharger or supercharger is described. In one example, boost is increased in response to a change in road conditions before a driver reacts to the change in road conditions by applying an accelerator pedal. The boost is increased to reduce compressor lag, thereby increasing the responsiveness of the engine and vehicle.

20 Claims, 5 Drawing Sheets

(56) References Cited

U.S. PATENT DOCUMENTS

| | | | | |
|---|---|---|---|---|
| 2011/0144884 | A1* | 6/2011 | Miah | B60W 10/06 |
| | | | | 701/102 |
| 2013/0060448 | A1* | 3/2013 | Nakada | F02D 41/0007 |
| | | | | 701/102 |
| 2015/0105991 | A1* | 4/2015 | Uhlirsch | F02D 41/0002 |
| | | | | 701/84 |
| 2015/0275784 | A1* | 10/2015 | Whitney | F02D 13/02 |
| | | | | 701/102 |
| 2017/0030260 | A1* | 2/2017 | Nishio | F02B 33/40 |
| 2017/0356350 | A1* | 12/2017 | Li | F02D 11/02 |
| 2018/0072297 | A1* | 3/2018 | Ito | B60W 10/06 |
| 2018/0126975 | A1* | 5/2018 | Johri | B60W 20/11 |

* cited by examiner

METHOD AND SYSTEM FOR PROVIDING BOOST TO AN INTERNAL COMBUSTION ENGINE

FIELD

The present description relates to methods and a system for providing boost to an internal combustion engine of a vehicle. The boost may be provided via a turbocharger or a supercharger and the boost may be provided such that it is provided in anticipation of an increase in driver demand torque or requested vehicle acceleration.

BACKGROUND AND SUMMARY

An internal combustion engine may be turbocharged or supercharged to provide pressurized air (e.g., boost) to the engine so that the engine's power output capacity may be increased beyond the engine's power output capacity if the engine were normally aspirated. Turbochargers may increase boost as engine speed and load increase, but turbochargers may not increase boost as fast as is desired, especially at low engine speeds, because of inertia of turbocharger components and because of limited energy in the engine exhaust during some conditions. Supercharger response may also be delayed if the supercharger is clutch operated. Accordingly, if a human driver applies an accelerator pedal or directly requests vehicle acceleration, the engine and vehicle may not respond as quickly as is desired by the human driver.

During the course of everyday driving, driving conditions may change such that a human driver may request a larger driver demand torque or increased vehicle acceleration in response to the change in driving conditions. However, the human driver may provide a delayed response to the change in driving conditions so that the human driver falls behind traffic conditions and then attempts to catchup to the change in traffic conditions by increasing driver demand torque or requested vehicle acceleration. Nevertheless, the vehicle may not respond as quickly as the human driver would like, so the human driver may increase the driver demand torque or requested vehicle acceleration amount even more. Consequently, the vehicle may eventually accelerate at a rate that is faster than if the human driver had provided a timely more subdued response to the changing traffic conditions. As a result, vehicle fuel consumption and emissions may increase. Further, vehicle drivability and comfort may decrease.

The inventors herein have recognized the above-mentioned issues and have developed a vehicle operating method, comprising: receiving road condition data to a controller; increase a boost amount a predetermined boost amount in response to the road condition data via the controller; and adjusting the predetermined boost amount in response to a difference between an actual boost amount and a desired boost amount, where the actual boost amount is generated via increasing the boost amount by the predetermined boost amount. Specifically, the method exploits a delay in human driver response to external stimulus. For non-emergency actions/maneuvers, human drivers exhibit delays ranging from 0.5 to 1.5 seconds. This delay provides enough time for the control system to detect the change in conditions and prebuild boost leading to better drivability and improved fuel economy through the mechanism described above.

By increasing a boost by a predetermined amount in response to road condition data received by a controller, it may be possible to provide the technical result of improving vehicle drivability and fuel economy. Further, by adjusting the predetermined boost amount in response to a difference between an actual boost amount and a desired boost amount, it may be possible to reduce under boost and over boost so that the engine's efficiency during transient conditions may be improved while improving engine response. Consequently, engine boost may be adjusted to a level that may reduce engine output lag so that a driver may more closely follow a vehicle acceleration trajectory that provides desired vehicle acceleration and fuel consumption levels. The predetermined boost amount may then be applied in response to subsequent changes in road conditions to improve vehicle response without excessively decreasing vehicle fuel economy.

The present description may provide several advantages. For example, the approach may improve vehicle fuel economy by reducing the need for higher vehicle acceleration rates to follow a desired vehicle acceleration trajectory. Further, the approach may help to reduce engine torque production lag that may decrease vehicle drivability. Further still, the approach may adapt predetermined boost increase amounts to reduce the possibility of over boosting or under boosting the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
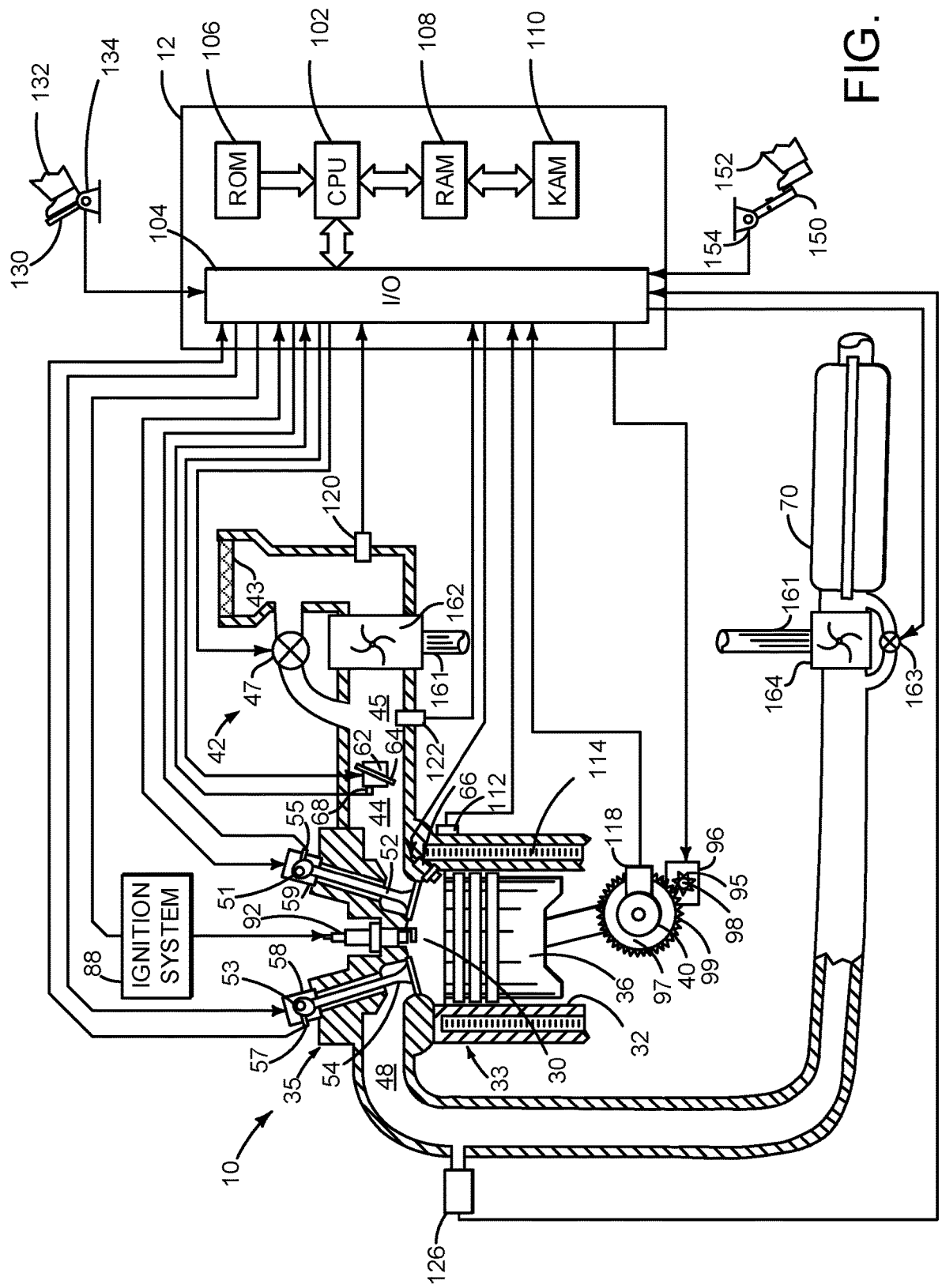
FIG. 1 shows a schematic diagram of an internal combustion engine that may be automatically stopped and started.
Figure 2:
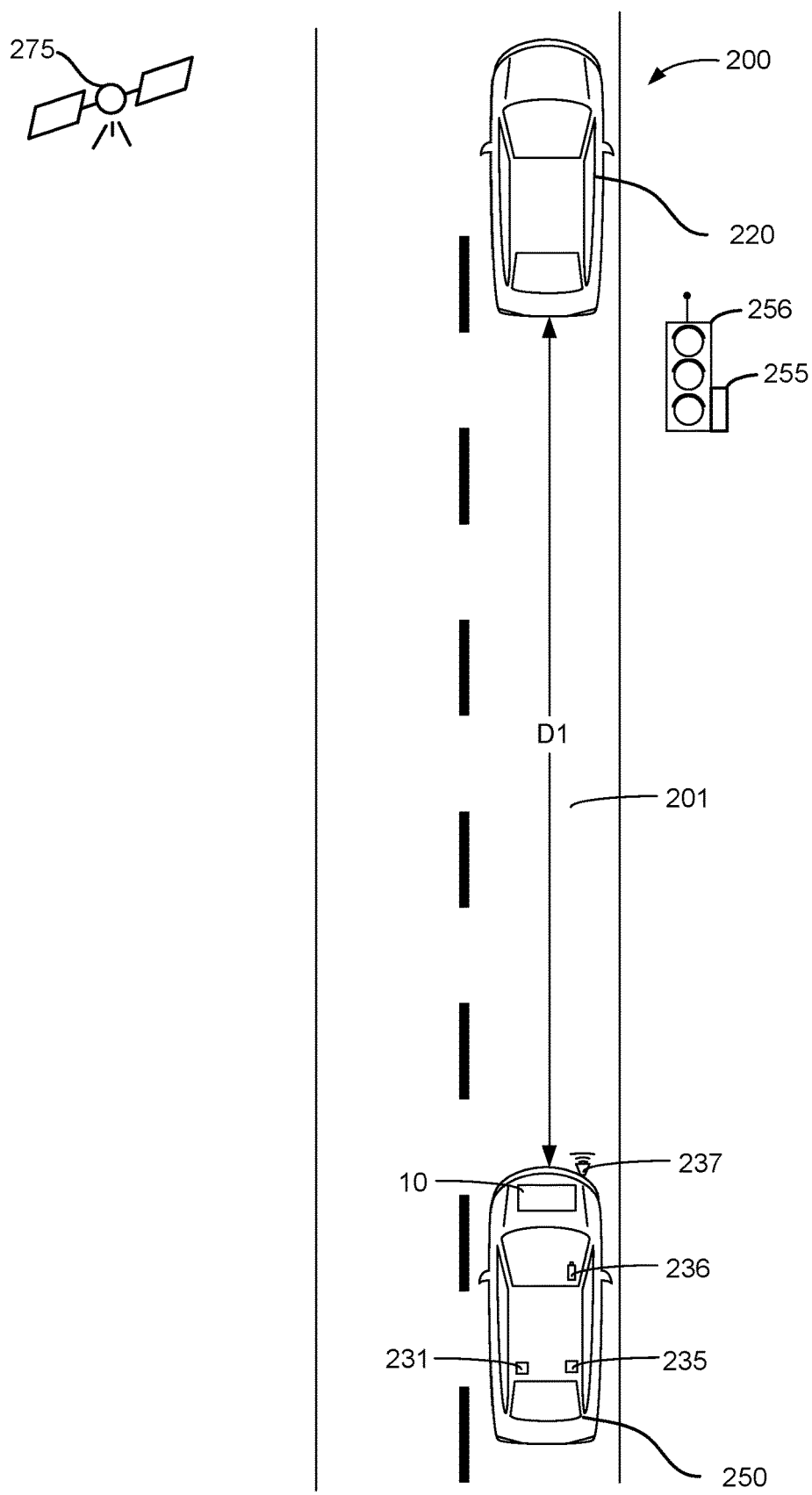
FIG. 2 shows a vehicle that includes the engine of FIG. 1 traveling on a road.
Figure 3:
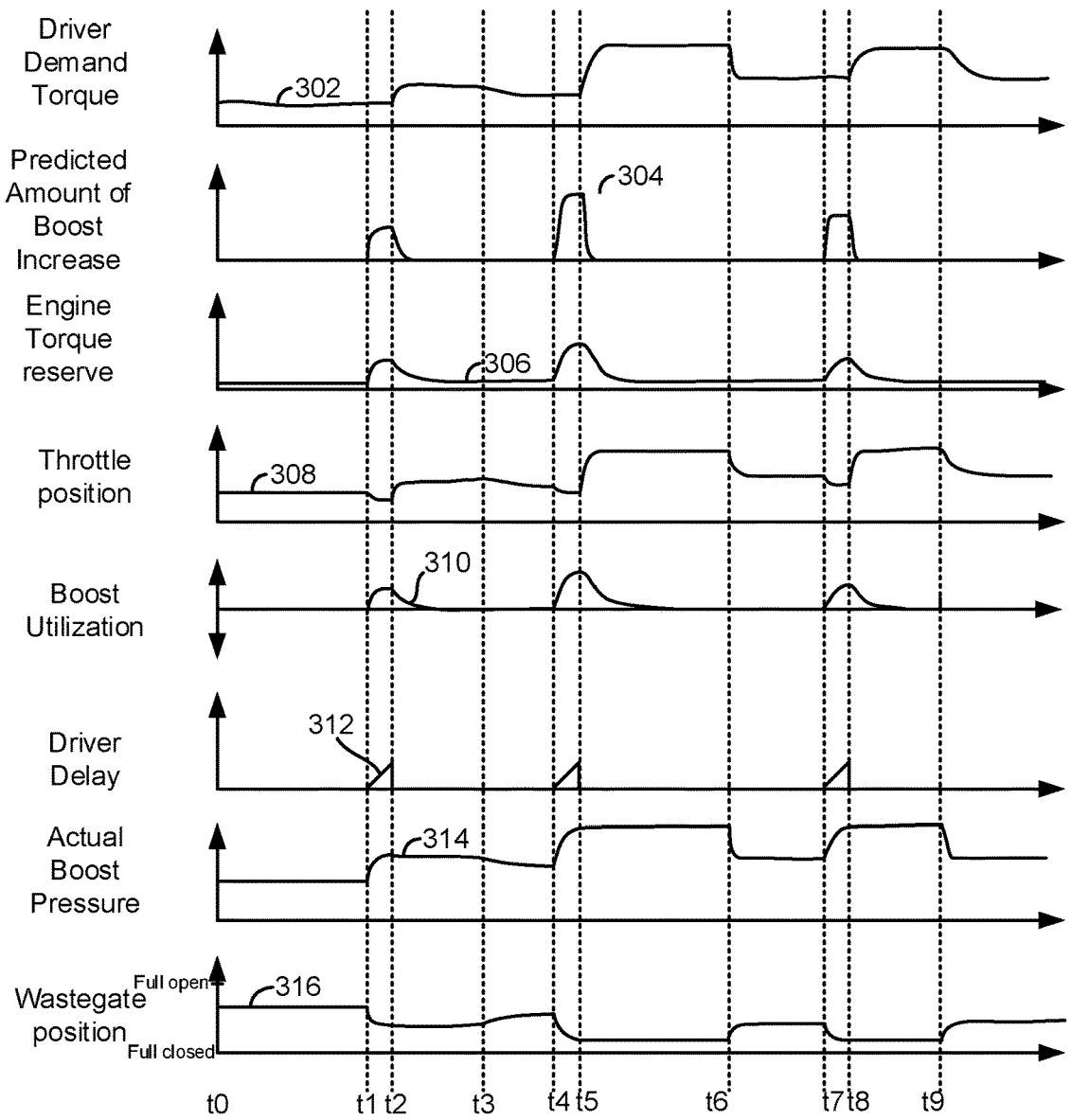
FIG. 3 shows a plot of an example operating sequence.
Figure 4:
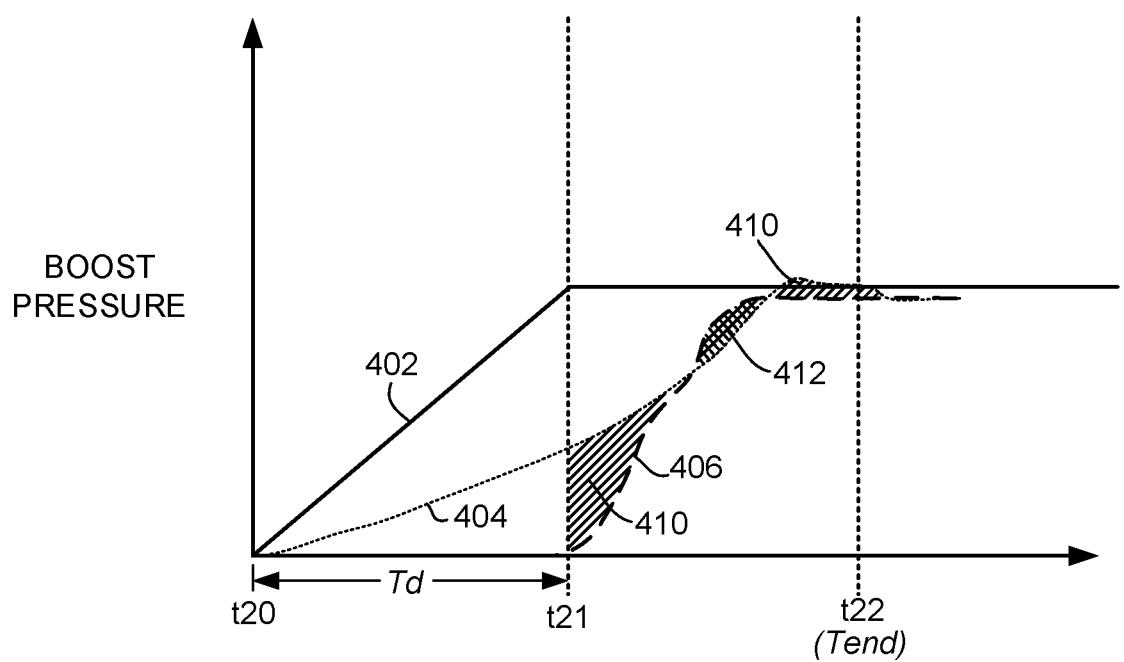
FIG. 4 shows plots of an example vehicle operating sequence according to the method of FIG. 5.
Figure 5:
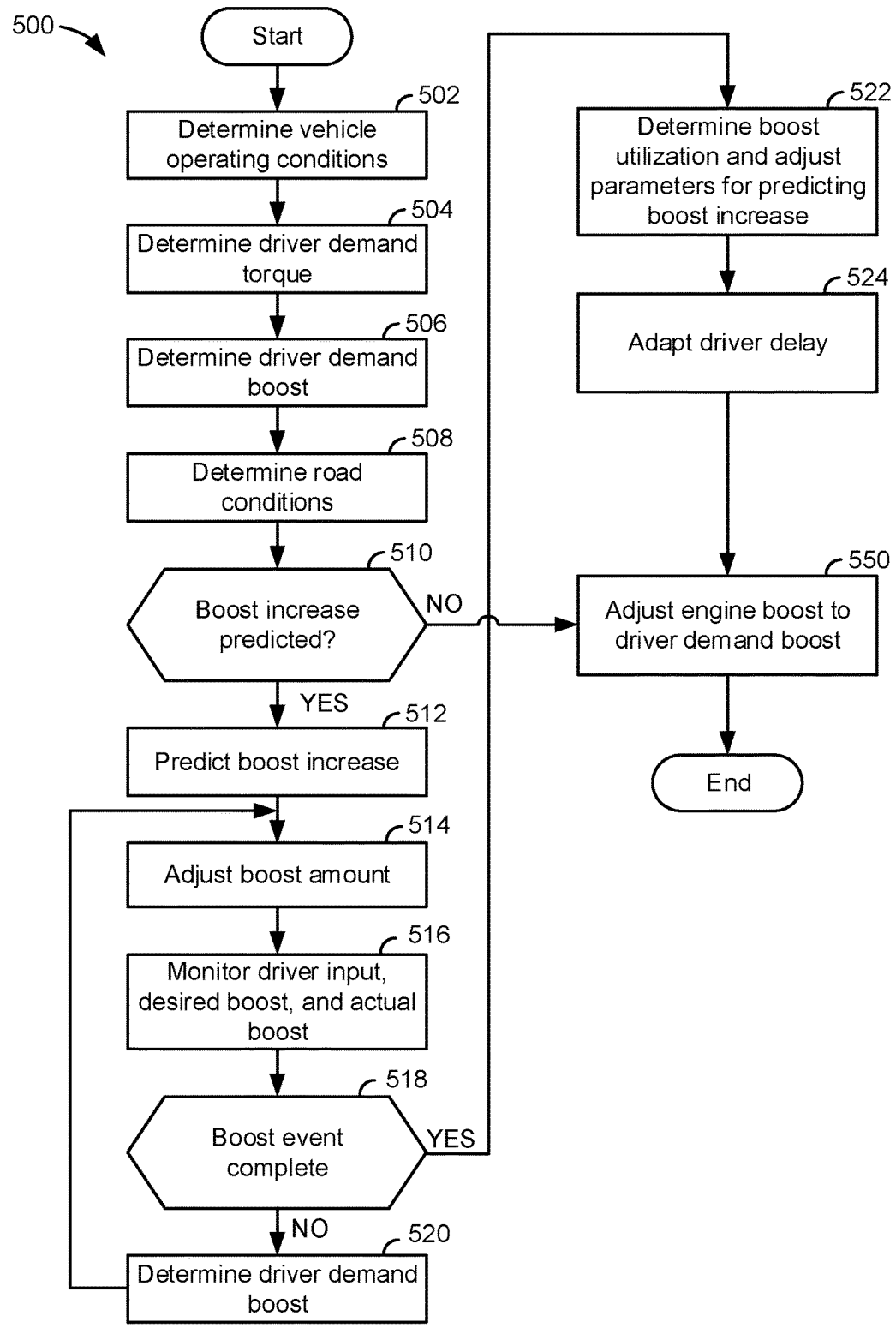
FIG. 5 shows a high level flowchart of a method to generate boost within an internal combustion engine.

The present description is related to generating boost within an internal combustion engine. Boost is generated before it is demanded so that engine torque production lag may be reduced. In one example, boost may be increased in response to road conditions that may provide impetus to a human driver to increase a driver demand torque or a vehicle acceleration request. The boost may be generated in an engine as is shown in FIG. 1. The engine of FIG. 1 may be included in a vehicle as is shown in FIG. 2. The engine and vehicle may operate as is shown in the sequence of FIG. 3. Driver demand delay relative to a change in road conditions and the evolution of boost pressures in an engine are shown in the plot of FIG. 4. A flowchart of a method for generating boost within an engine is shown in FIG. 5.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and FIG. 2 and employs the various actuators of FIG. 1 to adjust engine operation based on the received signals and instructions stored on a memory of controller 12. For example, pressure in boost chamber 45 (boost pressure) may be adjusted responsive to driver demand torque input to an accelerator pedal via controlling a position of wastegate 163. Further, engine torque output may be adjusted responsive to driver demand torque via adjusting a torque actuator (e.g., fuel injector 92, ignition system 88, throttle 62, and camshafts 51 and 53.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor that is driven via crankshaft 40. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In other examples, additional controllers may cooperate and communicate with controller 12 to operate engine 12 and other devices of a vehicle. For example, a transmission controller and a vehicle system controller may communicate and exchange data with controller 12 and other vehicle systems such as radio detection and ranging (RADAR) systems, light detection and ranging (LIDAR) systems, communications systems, and vehicle to vehicle communications systems. Thus, the systems and methods described herein apply to distributed systems with multiple controllers having specific functions.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, two vehicles traveling on a road are shown. Road 200 includes a first vehicle 250 including engine 10 with all the components shown in FIG. 1 and a second vehicle 220 traveling in a first lane 201 of road 200. Vehicle range sensors 237 (e.g. RADAR or LIDAR) report a distance D1 between first vehicle 250 and second vehicle 220 when second vehicle 202 is traveling in the path (e.g., same lane) of first vehicle 250 and when there are no intermediate vehicles between first vehicle 250 and second vehicle 220. The distance D1 may be updated at a predetermined rate (e.g., every 100 milliseconds) and supplied to controller 12 shown in FIG. 1. If vehicle 220 turns off the road and the road is clear in front of vehicle 250 when speed of vehicle 250 is below the road's speed limit, controller 12 of FIG. 1 may determine that vehicle acceleration is expected or anticipated from data provided by the vehicle range sensors since the road has just been cleared.

Camera 236 may also detect road conditions such as objects in the path of vehicle 250, traffic signs that are being approached by vehicle 250, operating states of traffic lights 256, highway on ramps, etc. Camera 236 may supply such information in the form of data to controller 12 or a controller that is in communication with controller 12. If camera 236 detects an object being cleared from the path of vehicle 250 when speed of vehicle 250 is below the road's speed limit, controller 12 of FIG. 1 may determine that vehicle acceleration is expected or anticipated from data provided by the camera. Similarly, if camera 236 detects that traffic light controller 255 has just changed traffic light 256 from red to green; controller 12 may determine that vehicle acceleration is expected from data provided by the camera.

Receiver 235 may receive traffic data from traffic signal controller 255 that indicates traffic light phase and timing. Receiver 235 may communicate the same information to controller 12 of FIG. 1 and controller 12 may determine that vehicle acceleration or an increase of driver demand torque is anticipated or expected from the data. For example, if controller 12 determines that road 201 is clear of traffic, vehicle 250 is decelerating or traveling below the speed limit of road 201, and traffic light 256 has just changes state from red to green, then controller 12 may predict or anticipate that the driver will increase driver demand torque and/or request vehicle acceleration.

Receiver 231 may receive position data from satellite 275 for determining the position of vehicle 250. Receiver 231 may communicate the same information to controller 12 of FIG. 1 and controller 12 may determine that vehicle acceleration or an increase of driver demand torque is anticipated or expected from the data. For example, if controller 12 determines that vehicle speed is less than highway speed and vehicle 250 is entering a highway on ramp, then controller 12 may predict or anticipate that the driver will increase driver demand torque and/or request vehicle acceleration. Further, controller 12 may use position data for vehicle 250 and speed limit data for road 201 to determine that vehicle 250 is approaching a section of road where the speed limit of road 201 is increased. Controller 12 may then determine that the driver will increase driver demand torque and/or request vehicle acceleration when the speed limit increase is indicated to the driver at a particular position of the vehicle.

Thus, the various sensors shown in FIG. 2 may provide data that allows controller 12 to anticipate a driver demand increase and/or a vehicle acceleration request. The data may be processed at a rate that exceeds human response time so that boost pressure may be adjusted to the road conditions previously described as well as other road conditions.

Thus, the system of FIGS. 1 and 2 provides for a vehicle system, comprising: an engine including a turbocharger and wastegate; an accelerator pedal; and a controller including executable instructions stored in non-transitory memory to adjust timing of changing a position of the wastegate as a function of a delay of a driver applying the accelerator pedal in response to a road condition. The vehicle system further comprises additional instructions to increase a boost amount by a predetermined amount. The boost amount is increased by the predetermined amount via the controller in response to the road condition. The vehicle system includes where the predetermined amount is a function of vehicle speed and a road speed limit. The vehicle system includes where changing the position of the wastegate includes closing the wastegate. The vehicle system further comprises additional instructions to increase a boost amount by a predetermined boost amount. The boost amount is increased by the predetermined amount via the controller in response to the road condition data, and the predetermined boost amount is based on a prior utilization of boost applied during a human driver's request to accelerate a vehicle.

Referring now to FIG. 3, a vehicle operating sequence according to the method of FIG. 5 is shown. The sequence of FIG. 3 may be generated via the system of FIGS. 1 and 2. The vertical lines at t0-t9 represent times of interest during the sequence.

The first plot from the top of FIG. 3 is a plot of driver demand torque versus time. The vertical axis represents driver demand torque and driver demand torque increases in the direction of the vertical axis arrow. The horizontal axis represents time and the amount of time increases from the left side of the plot to the right side of the plot. Trace 302 represents driver demand torque. The driver demand torque may be determined from accelerator pedal position and vehicle speed. In one example, accelerator pedal position and vehicle speed are used to reference or index a table or function of empirically determined driver demand torque values. The table or function outputs the driver demand. Values in the table may be determined via driving a vehicle and adjusting driver demand values in relation to accelerator pedal position until a desired vehicle response is observed.

The second plot from the top of FIG. 3 is a plot of a predicted amount of boost increase versus time. The predicted amount of boost increase is an additional amount of boost that is added to the present amount of engine boost that is commanded immediately before the change in road conditions is detected. The predicted amount of boost increase is commanded at a time that is based on the driver response delay to a change in road conditions. The vertical axis represents the predicted amount of boost increase and the predicted amount of boost increase grows in the direction of the vertical axis arrow. Trace 304 represents the predicted amount of boost increase. The horizontal axis represents time and the amount of time increases from the left side of the plot to the right side of the plot.

The third plot from the top of FIG. 3 is a plot of engine torque reserve (e.g., an amount of torque that the engine is capable of generating at the present engine speed that is in addition to the present amount of torque the engine is generating) versus time. The vertical axis represents the amount of engine torque reserve and the amount of engine torque reserve increases in the direction of the vertical axis arrow. Trace 306 represents the amount of engine torque reserve. The horizontal axis represents time and the amount of time increases from the left side of the plot to the right side of the plot.

The fourth plot from the top of FIG. 3 is a plot of engine throttle position versus time. The vertical axis represents engine throttle position and the engine throttle opening amount increases in the direction of the vertical axis arrow. Trace 308 represents the engine throttle position. The horizontal axis represents time and the amount of time increases from the left side of the plot to the right side of the plot.

The fifth plot from the top of FIG. 3 is a plot of engine boost utilization versus time. The vertical axis represents engine boost utilization during a predicted increase in driver demand torque or requested vehicle acceleration. The boost utilization is a measure of the amount of actual boost that is used by the engine when a driver responds to a change in road conditions and requests vehicle acceleration. If the boost utilization number is positive and large, then too much actual boost is being generated relative to the driver request to increase torque or vehicle acceleration. If the boost utilization number is negative with a large magnitude, then too little actual boost is being generated relative to the driver request to increase torque or vehicle acceleration. Trace 310 represents the boost utilization amount. The horizontal axis represents time and the amount of time increases from the left side of the plot to the right side of the plot.

The sixth plot from the top of FIG. 3 is a plot of driver response delay to a change in road conditions versus time. The vertical axis represents the amount of time of the driver response delay to the change in road conditions and the amount of time of the driver response delay increases in the direction of the vertical axis arrow. Trace 312 represents the amount of time of the driver response delay to the change in road conditions. The horizontal axis represents time and the amount of time increases from the left side of the plot to the right side of the plot. The driver response delay value increases from a time the change in road conditions is detected until the driver responds by applying the accelerator pedal. The final value reached at the time the accelerator pedal is applied is the driver response delay.

The seventh plot from the top of FIG. 3 is a plot of actual engine boost pressure versus time. The vertical axis represents actual engine boost pressure and the actual boost pressure increases in the direction of the vertical axis arrow. Trace 314 represents the amount of actual boost. The horizontal axis represents time and the amount of time increases from the left side of the plot to the right side of the plot.

The eighth plot from the top of FIG. 3 is a plot of turbocharger wastegate position versus time. The vertical axis represents wastegate position and the wastegate opening amount increases in the direction of the vertical axis arrow. Trace 316 represents wastegate position. The horizontal axis represents time and the amount of time increases from the left side of the plot to the right side of the plot.

At time t0, the driver demand torque is at a middle level and the predicted amount of boost increase is zero (at the level of the horizontal axis). The engine torque reserve is a low value so that engine efficiency may be higher. The throttle is open to a middle level and the boost utilization number is zero since conditions are not present for responding to a change in road conditions. The driver delay value is also zero since conditions are not present for responding to a change in road conditions. The actual boost pressure is at a middle level and the wastegate is open at a middle level.

At time t1, a change in road conditions (not shown) that may result in the human driver requesting a larger driver demand torque or increased vehicle acceleration is detected via vehicle sensors (e.g., RADAR, LIDAR, global positioning system (GPS), camera, etc.). The driver demand torque remains unchanged since the human driver does not respond immediately to the change in road conditions. The predicted amount of boost is increased in response to the change in road conditions and the actual boost pressure increases in response to the increasing predicted amount of boost. The actual boost pressure is increased via partially closing the wastegate. The throttle is also partially closed as the actual boost pressure is increased so that the amount of air flowing into the engine remains unchanged (not shown). The boost utilization begins to increase as the actual boost pressure increases. The driver response delay to a change in road conditions begins to increase since a change in road conditions has been identified by the controller.

At time t2, the human driver responds to the change in road conditions by increasing the driver demand torque. The predicted amount of boost increase begins to level off and the engine torque reserve begins to decline as the increasing driver demand torque begins to utilize a portion of the engine torque reserve. The engine throttle begins to open further to increase air flowing into the engine, thereby increasing engine torque to match the driver demand torque. The boost utilization begins to decrease as the boost demanded from the driver demand torque increase (not shown). The driver response delay to the changed road conditions reaches a final value in response to the driver increasing the demand torque. The actual boost pressure has reached a level that is based on the predicted amount of boost increase and the wastegate position has leveled off to a value that provides the actual boost pressure that is shown.

Between time t2 and time t3, the driver demand torque changes only a small amount and the predicted amount of boost is reduced since boost demanded by the driver is increasing the actual boost. The engine torque reserve is reduced to a small value as the increasing driver demand torque consumed the engine torque reserve. The engine throttle opening amount levels off and the boost utilization decreases as the actual boost increases. The driver response delay to the change in road conditions is reset to zero since the driver response delay to the changed road condition has already been determined at time t2. The actual boost pressure has leveled off to a middle level and the wastegate position has also leveled off.

At time t3, the driver demand change or vehicle acceleration rate change due to the change in road conditions has ended and the driver demand torque has been reduced a small amount. The predicted amount of boost increase has been reduced to zero since an increase in driver demand torque or vehicle acceleration is no longer expected or anticipated. The engine torque reserve is reduced to a lower level in response to the predicted amount of boost increase decreasing. The throttle position begins to close in response to the reduction in driver demand torque. The boost utilization value has reached a final value for the change in road condition event (e.g., an engine boost increase event) and the actual boost pressure begins to be reduced in response to the decreasing driver demand torque. The wastegate position begins to open so that the actual boost pressure may be lowered. The boost utilization value and the driver delay time are used to adapt the predicted amount of boost.

Between time t3 and time t4, the driver demand torque levels off to a value that is slightly greater than its value at time t0 and the predicted amount of boost increase is zero since a change in road conditions is not observed. The engine torque reserve is at a lower level and the throttle opening amount is at a middle level. The boost utilization is zero and the driver delay is also zero. The actual boost pressure is at a higher middle level and the wastegate position is at a middle position.

At time t4, a change in road conditions (not shown) that may result in the human driver requesting a larger driver demand torque or increased vehicle acceleration is detected via vehicle sensors (e.g., RADAR, LIDAR, global positioning system (GPS), camera, etc.). The driver demand torque remains unchanged since the human driver does not respond immediately to the change in road conditions. The predicted amount of boost is increased in response to the change in road conditions. The throttle remains at its previous level since the actual boost has not changed. The boost utilization is zero since the human driver has not increased the driver demand torque or the requested engine acceleration. The driver response delay to a change in road conditions begins to increase since the controller has identified a change in road conditions.

Between time t4 and time t5, the wastegate begins to close and the actual boost pressure begins to build. The closing amount for the wastegate is reduced a small amount relative to the predicted amount of boost increase, but because the predicted amount of boost is greater than at time t1, the wastegate is closed more than at time t1. The wastegate position adjustments are provided in response to the boost utilization value determined at time t3. The engine torque reserve increases in response to the actual engine boost increasing. The driver response delay to the change in road conditions continues to increase since the driver has not increased the driver demand torque in response to the change in road conditions. The actual boost pressure increases and then levels off to a higher value. The boost utilization increases as the actual boost pressure increases. The wastegate is nearly fully closed.

At time t5, the human driver responds to the change in road conditions by increasing the driver demand torque. The predicted amount of boost increase has leveled off and the engine torque reserve begins to decline as the increasing driver demand torque begins to utilize a portion of the engine torque reserve. The engine throttle begins to open further to increase air flowing into the engine. The boost utilization begins to decrease but at a lower rate than at time t2 since the wastegate was closed less relative to the predicted amount of boost pressure. The actual boost pressure is at a stabilized level and the wastegate position has stabilized.

Between time t5 and time t6, the driver demand torque changes only a small amount and the predicted amount is reduced since driver demand boost is increasing to generate the actual boost. The engine torque reserve is reduced to a small value as the increasing driver demand torque consumes the engine torque reserve. The engine throttle opening amount levels off to a higher level and the boost utilization has decreased with the increasing amount of actual boost. By adapting the wastegate closing amount, boost utilization may be improved. The driver response delay to the change in road conditions is reset to zero since the driver response delay to the change in road conditions has already been determined at time t5. The actual boost pressure has leveled off to a higher level and the wastegate position has leveled off.

At time t6, the change in driver demand or in vehicle acceleration rate that is due to the change in road conditions has ended and the driver demand torque has been reduced. The predicted amount of boost increase has been reduced to zero since an increase in driver demand torque or vehicle acceleration is no longer expected or anticipated. The engine torque reserve is reduced to a lower level in response to the predicted amount of boost increase decreasing. The throttle position begins to close in response to the reduction in driver demand torque. The boost utilization value has been reduced to zero. The wastegate position begins to open so that the actual boost pressure may be lowered. The boost utilization value and the driver delay time are used to adapt the predicted amount of boost stored in controller memory.

Between time t6 and time t7, the driver demand torque levels off to a value that is greater than its value at time t5 and the predicted amount of boost increase is zero since a change in road conditions is not observed. The engine torque reserve is at a lower level and the throttle opening amount is at a middle level. The boost utilization is zero and the driver delay is zero. The actual boost pressure is at a higher middle level and the wastegate position is at a lower position.

At time t7, a change in road conditions (not shown) that may result in the human driver requesting a larger driver demand torque or increased vehicle acceleration is detected again via vehicle sensors (e.g., RADAR, LIDAR, global positioning system (GPS), camera, etc.). The driver demand torque remains unchanged since the human driver does not respond immediately to the change in road conditions. The predicted amount of boost is increased in response to the change in road conditions, but the closing amount of the wastegate is reduced further as a function of the adapted predicted amount of boost so that boost utilization may be improved. The throttle remains at its previous level since the actual boost has not changed. The boost utilization begins to increases as the actual boost increases. The driver response delay to a change in road conditions begins to increase since the controller has identified a change in road conditions.

Between time t7 and time t8, the closing amount for the wastegate is reduced a medium amount relative to the predicted amount of boost increase. The wastegate position adjustments were provided in response to the boost utilization value determined at time t6. The engine torque reserve increases in response to the actual engine boost increasing. The driver response delay due to the change in road conditions continues to increase since the driver has not increased the driver demand torque in response to the change in road conditions. The actual boost pressure increases and then levels off to a higher value. The boost utilization value increases as the actual boost increases. The wastegate is nearly fully closed.

At time t8, the human driver responds to the change in road conditions by increasing the driver demand torque. The predicted amount of boost increase has leveled off and the engine torque reserve begins to decline as the increasing driver demand torque begins to utilize a portion of the engine torque reserve. The engine throttle begins to open further to increase air flowing into the engine. The boost utilization value begins to decrease as the driver demand boost (not shown) increases. The actual boost pressure is at a stabilized level and the wastegate position has stabilized.

Between time t8 and time t9, the driver demand torque changes only a small amount and the predicted amount of boost is reduced as the amount of driver demand boost increases (not shown). The engine torque reserve is reduced to a small value as the increasing driver demand torque consumed the engine torque reserve. The engine throttle opening amount levels off to a higher level and the boost utilization is reduced to zero. By further reducing the wastegate closing amount via adapting the predicted boost value, boost utilization may be improved. The driver response delay to the change in road conditions is reset to zero since the driver response delay to the change in road conditions has already been determined at time t8. The actual boost pressure has leveled off to a higher level and the wastegate position has leveled off.

At time t9, the change in driver demand or the change in vehicle acceleration rate that is due to the change in road conditions has ended and the driver demand torque has been reduced. The predicted amount of boost increase has been reduced to zero since an increase in driver demand torque or vehicle acceleration is no longer expected or anticipated. The engine torque reserve is reduced to a lower level in response to the predicted amount of boost decreasing. The throttle begins to close in response to the reduction in driver demand torque. The boost utilization value is reduced to zero and the actual boost pressure begins to be reduced in response to the decreasing driver demand torque. The wastegate begins to open further so that the actual boost pressure may be lowered.

In this way, the wastegate closing amount and timing may be adjusted in response to a change in road conditions that is likely to cause the human driver to increase the driver demand torque or requested vehicle acceleration. By commanding the wastegate closed before the driver changes that driver demand torque, the engine may be ready to provide increased amounts of torque so that when the vehicle's human driver requests vehicle acceleration or increased driver demand torque, the torque and acceleration produced by the engine allows the human driver to follow a desired vehicle acceleration profile.

Referring now to FIG. 4, a plot of engine boost pressure evolution related to a change in road conditions that is expected or anticipated to cause a human driver of a vehicle to increase an engine torque request or vehicle acceleration request is shown. The vertical axis represents engine boost pressure and boost pressure increases in the direction of the vertical axis arrow. The horizontal axis represents time and time increases from the left side of the figure to the right side of the figure. Time t20 represents a time when a change in road conditions is detected. The change in road conditions is expected or anticipated to cause a human driver of the vehicle to increase an engine torque request or vehicle acceleration request. The change in road conditions is detected via vehicle sensors. The change in road conditions may be a vehicle exiting the path of the vehicle, a light changing from red to green, the vehicle entering an on ramp to a highway, or other such road condition.

Solid line 402 represents a commanded or desired engine boost that is responsive to the change in road conditions that is expected or anticipated to cause the human driver of the vehicle to increase the engine torque request or the vehicle acceleration request. The desired engine boost command is generated in response to the change in road conditions so that sufficient boost may be available to improve engine torque output when the human driver actually requests additional torque from the engine to accelerate the vehicle.

Dashed line 404 is the actual boost generated within the engine when the engine is commanded to increase boost to the desired engine boost 402. The actual boost lags the desired engine boost, but the level of actual boost is much greater than engine boost if the boost is increased when the driver increases the demand torque or vehicle acceleration torque.

Large dashed line 406 is a driver demand boost that is determined from the driver demand torque or vehicle acceleration torque that is requested by the human driver. The driver demand boost that is determined from the driver demand torque begins to increase at time t21. The human driver has a delayed response time t0 the change in road conditions that is indicated as the time delay Td shown between time t20 and time t21. The amount of driver delay time Td may be different for different drivers and different driving conditions. Shaded areas 410 and 412 represent boost utilization. Diagonal hatched area 410 contributes positively to boost utilization and crosshatched area 412 contributes negatively to boost utilization. Thus, boost utilization increases when actual boost is greater than driver demand boost. Boost utilization decreases when actual boost is less than driver demand boost. The boost utilization is the sum of the shaded areas 410 and 412 and it may be expressed as an integral as described in method 500. If the boost utilization is a large positive valve, then subsequent commands to prebuild boost before the vehicle driver requests boost may be reduced to lower boost utilization. Conversely, if the boost utilization is a large negative valve, then subsequent commands to prebuild boost before the vehicle driver requests boost are increased to increase boost utilization.

Referring now to FIG. 5, a method for operating a vehicle is shown. At least portions of method 500 may be implemented as executable controller instructions stored in non-transitory memory. Method 500 may operate in cooperation with the system of FIGS. 1 and 2. Additionally, portions of method 500 may be actions taken in the physical world via the controller to transform an operating state of an actuator or device. The method of FIG. 5 may be incorporated into the system of FIGS. 1 and 2 as executable instructions stored in non-transitory memory.

At 502, method 500 determines vehicle operating conditions. Vehicle operating conditions may include but are not limited to vehicle speed, presently engaged transmission gear, engine speed, engine load, accelerator pedal position, requested vehicle acceleration amount, engine boost amount, engine temperature, vehicle speed, and ambient temperature and pressure. The vehicle operating conditions may be determined from output of the various sensors input to a controller. Method 500 proceeds to 504.

At 504, method 500 determines driver demand torque. In one example, method 500 determines driver demand torque by referencing a table that holds empirically determined values of driver demand torque. The table may be referenced by accelerator pedal position and present vehicle speed. Alternatively, method 500 determines requested vehicle acceleration by referencing a table that holds empirically determined values of requested vehicle acceleration. The table may be referenced by accelerator pedal position and present vehicle speed. Method 500 proceeds to 506.

At 506, method 500 determines a driver demand boost amount. In one example, a table or function of empirically determined values of driver demand boost may be referenced using driver demand torque and engine speed. Values in the table may be determined by mapping the engine on a dynamometer and adjusting the engine boost to a level that provides a desired level of engine efficiency and the driver demand torque. Alternatively, a table or function of empirically determined values of driver demand boost may be referenced using requested vehicle acceleration and engine speed. Values in the table may be determined by mapping the vehicle on a dynamometer and adjusting the engine boost to a level that provides a desired level of engine efficiency and the vehicle acceleration. Method 500 proceeds to 508 after determining the driver demand boost amount.

At 508, method determines road conditions on the road the vehicle is traveling. Method 500 may determine road conditions via one or more of a camera, RADAR, LIDAR, GPS, vehicle to vehicle communications (radio), and vehicle to infrastructure communications (e.g., radio communication between the vehicle and traffic controllers). Method 500 proceeds to 510.

At 510, method 500 judges if road conditions have changed such that a human driver of the vehicle may be expected or anticipated to respond to the change in road conditions by requesting additional boost. The increase in boost may be driven via an increase in driver demand torque (e.g., torque requested by the human driver via the accelerator pedal) or vehicle acceleration. For example, to increase engine torque to provide the requested driver demand torque or vehicle acceleration, the engine boost may be increased. Thus, an increase in engine boost may follow an increase in driver demand torque or requested vehicle acceleration. Method 500 may judge that a human driver of the vehicle may be expected or anticipated to respond to the change in road conditions if the road conditions indicate that an object has left the path of the vehicle the human is driving so that the human may accelerate the vehicle. Further, method 500 may judge that a human driver of the vehicle may be expected or anticipated to respond to the change in road conditions if the road conditions indicate that the vehicle the human is driving has entered a highway on ramp so that the human may accelerate the vehicle. Further still, method 500 may judge that a human driver of the vehicle may be expected or anticipated to respond to the change in road conditions if the road conditions indicate that a traffic light has changed from red to green so that the human may accelerate the vehicle. Additionally, method 500 may judge that a human driver of the vehicle may be expected or anticipated to respond to the change in road conditions if the road conditions indicate that a speed limit of a road the human is driving the vehicle on is increasing so that the human may accelerate the vehicle. Of course, the road conditions mentioned herein is not meant to be an exhaustive list of road conditions that the human driver may respond to by increasing the driver torque demand or the vehicle acceleration request, but such conditions are within the scope of this disclosure. If method 500 predicts an increased boost associated with an increase in driver demand torque or vehicle acceleration in response to road conditions, the answer is yes and method 500 proceeds to 512. Otherwise, the answer is no and method 500 proceeds to 550.

At 550, method 500 adjusts the engine boost amount to the driver demand boost amount determined at 506 or the driver demand boost determined at 521. In one example, method 500 adjusts a position of a wastegate to provide the driver boost amount. The wastegate position may be extracted from a table or function that is referenced or indexed by the driver demand boost amount, engine speed, and engine load. Values in the table or function may be empirically determined and stored in the table. The values in the table may be determined via operating the engine on a dynamometer and adjusting the wastegate position until the driver demand boost amount is achieved. Method 500 commands the wastegate to a position that provides the driver demand boost amount. Method 500 proceeds to exit.

At 512, method 500 predicts an increase in an amount of boost to meet the change in road conditions determined at 510. In one example, method 500 predicts an increase in the amount of boost by referencing a table of empirically determined engine boost values. The engine boost values stored in the table may be adjusted or adapted in response to the value of the boost utilization discussed at 522. The table may be referenced by the present vehicle speed and a predicted requested vehicle acceleration rate. The table outputs the predicted amount of engine boost increase that is due to the change in road conditions. The predicted requested vehicle acceleration rate may depend on the road condition that was used to predict the engine boost increase at 510. In one example, the predicted vehicle acceleration rate changes responsive to the present vehicle speed and the speed limit of the road the vehicle is traveling upon. For example, if the present vehicle speed is low and the speed limit of the road is high and an object has just moved out of the vehicle's path, then the predicted vehicle acceleration rate may be high. However, if the present vehicle speed is medium and the speed limit is only 10% greater than the present vehicle speed, and an object has just moved out of the vehicle's path, then the predicted vehicle acceleration rate may be low. Similarly, if a speed limit of the road on which the vehicle is traveling increases by 50%, then the predicted vehicle acceleration rate may be high. However, if the speed limit of the road on which the vehicle is traveling increases by 10%, then the predicted vehicle acceleration rate may be low. In still other examples, the predicted boost amount may be a constant value that may be adapted. The predicted increase in an amount of boost to meet the change in road conditions may be determined from a plurality of tables or functions that are referenced via the road conditions mentioned herein. The values in the tables may be empirically determined via operating a vehicle on a road or dynamometer and adjusting table values responsive to the road conditions that are encountered. Method 500 proceeds to 514 after predicting the engine boost amount.

At 514, method 500 commands the increase in engine boost from the present boost amount. Thus, the engine boost amount may be adjusted responsive to the following equation:

$$Desired\_boost = Driverdemand\_boost + Predicted\_boost$$

where Desired_boost is the commanded or desired engine boost, Driverdemand_boost is the driver demand boost determined at 506, and Predicted_boost is the predicted engine boost increase due to changes in road conditions determined at 512. The desire boost is generated via adjusting a position of a wastegate to provide the desired boost amount. The wastegate position may be extracted from a table or function that is referenced or indexed by the desired boost amount, engine speed, and engine load. Values in the table or function may be empirically determined and stored in the table. The values in the table may be determined via operating the engine on a dynamometer and adjusting the wastegate position until the desired boost amount is achieved. Method 500 proceeds to 516.

At 516, method 500 monitors and stores to controller memory desired engine boost, actual engine boost (e.g., boost measured in boost chamber 45 of FIG. 1), and accelerator pedal position. Method 500 proceeds to 518.

At 518, method 500 judges if the boost event that is related or based on the change in road conditions is complete. In one example, method 500 may judge that the boost event is complete after a predetermined amount of time has passed since the most recent engine boost increase was predicted at 510. Alternatively, or in addition, method 500 may judge that the boost increasing event is complete if the driver demanded boost levels off to a constant value. In another example, method 500 may judge that the boost increasing event is complete after the driver has applied the accelerator pedal and the accelerator pedal is at a steady state or has been at least partially released after the most recent accelerator pedal application. If method 500 judges that the boost event is complete, then method 500 proceeds to 522. Otherwise, method 500 proceeds to 520.

At 520, method 500 determines a driver demand boost amount. The driver demand boost amount may be determined as it is described at 506. Thus, the driver demand boost may be adjusted for any changes it may undergo before the boost event is completed. Method 500 returns to 514 after determining the driver demand boost amount.

At 522, method 500 determines engine boost utilization. In one example, method 500 determines engine boost utilization from the following equation:

$$\text{Boost\_utilization}(T\text{end}) = \int_{T_d}^{T\text{end}} \text{boost\_actual}(t) - \text{boost\_demand}(t) dt$$

where Boost_utilization is the boost utilization value, boost_actual is the measured boost pressure in the engine, boost_demand is engine boost determined from the driver demand torque or requested vehicle acceleration, Tend is time at the end of the boost event, t is the present time, and Td is the driver response delay time. If boost utilization is greater than a threshold upper limit value, then the predicted boost value stored in the table described at 512 may be reduced (e.g., adapted) by a predetermined amount of boost. If predicted boost utilization is less than a threshold lower limit value, then the boost value stored in the table described at 512 may be increased (e.g., adapted) by a predetermined amount of boost. Method 500 proceeds to 524.

At 524, method 500 adapts or adjusts a predicted driver delay. The estimated human driver delay $\tau_k$ may vary as a function of time and the specific human driver of the vehicle. The human driver delay may be estimated over a plurality of changes in road condition event (e.g., engine boost increasing events where engine boost is increased in response to the road conditions changing or road condition events). In one example, an estimated human driver delay at each engine boost increasing event $\tau_k$, where k is the event number, may be determined by a change detection algorithm that is applied to the accelerator pedal. The human driver delay estimate $\tau_k$ is an amount of time after a change in road condition event (T20 in FIG. 4) that a driver reaction to the change in road conditions is detected at the accelerator pedal. The time at which the driver reacts may be estimated by a cumulative sum algorithm. The algorithm sums the accelerator pedal input values and indicates a driver reaction when the sum exceeds a threshold. The algorithm may be performed in a series of steps: Step 1: determine the initial accelerator pedal position $u_0$. This is the accelerator pedal position at time equal 0 (e.g., when the change in road conditions is detected). The value of $u_0$ may be taken as a direct value of the accelerator pedal position at time zero, or alternatively, it may be a filtered value of the accelerator pedal position. Step 2: Set a counter value to i=0 and initialize the sum $x_0$=0. The counter i denotes the i:th sample since time 0, i.e., $x_i$ denotes the value of x at time i$\Delta$t where $\Delta$t is the sample time (seconds), and x is a state value. Step 3: compute the sum $x_i$: $x_i = x_{i-1} + u_i - u_0 - \beta$; where $u_i$ is the current accelerator pedal position and $\beta$ is a small drift parameter to account for small changes in pedal due to noise etc. If the sum $x_i$ is negative, reset and update change time ĉ: If $x_i$<0, $x_i$=0, ĉ=i; The change time ĉ is the last time the sum was zero. Step 4: if the sum $x_i$ is above threshold h (a tunable parameter), reset $x_i$ and produce estimate of driver reaction: If $x_i$>h, $x_i$=0, $\tau_k$=ĉ; otherwise increase counter i by one and return to Step 3 to continue the summation unless too much time has passed (this limit will be of the same order as $T_{end}$).

The driver delay $T_d$ is initially set to a value expected for a nominal driver (e.g., 1 second). When estimates of driver delay are obtained, they are combined with an exponential forgetting factor. Specifically, the estimated driver delay $T_{d,k}$ (based on k events) is $$T_{d,k} = (1-\alpha)\tau_k + \alpha T_{d,k-1}$$

where $\tau_k$ is the estimate of driver delay from event k and a is a parameter between 0 and 1 governing the weighting between the new observation and the previous estimate. Note that for the first event (k=1), $T_{d,0}$ is the initial driver delay estimate for a nominal driver.

The adapted driver delay may then be used to adjust the boost command delay described at 514. In one example, the command delay time may be adjusted to be a fraction of the human driver delay time. For example, if the human driver delay time is 0.7 seconds and the boost command delay is 10% of the human driver delay, then the boost command delay is 0.07 seconds. Thus, the boost command delay may change as a function of the human driver delay. Method 500 proceeds to 550.

In this way, the amount of anticipated or predicted engine boost may be adapted based on utilization of engine boost produced during prior engine boost increasing events. Further, a boost command delay time between when road conditions that indicate an increase of engine boost may be predicted and when the boost increase is actually commanded may be adjusted or adapted as a function of a human driver response delay time. Such control actions may improve boost utilization, thereby improving engine efficiency while adjusting engine operation in anticipation of an increasing torque demand.

Thus, the method of FIG. 5 provides for a vehicle operating method, comprising: receiving road condition data to a controller; increasing a boost amount by a predetermined boost amount in response to the road condition data via the controller; and adjusting the predetermined boost amount in response to a difference between an actual boost amount and a desired boost amount, the actual boost amount generated via increasing the boost amount by the predetermined boost amount. The method includes where the desired boost amount is a boost amount that is determined from accelerator pedal position. The method includes where the road condition data includes traffic light switching time data. The method includes where the road condition data includes data generated via a camera. The method includes where the road condition data includes data generated via radio detection and ranging radar (RADAR) or a light detection and ranging system (LIDAR). The method includes where the predetermined boost amount is determined as a function of vehicle speed. The method includes where the predetermined boost amount is further determined as a function of a speed limit of a road a vehicle is traveling, the vehicle including the controller. The method includes where the predetermined boost amount is further determined as a function of a speed of a second vehicle traveling in the path of a first vehicle, the first vehicle including the controller. The method includes where adjusting the predetermined boost amount includes revising a value of the predetermined boost amount in controller memory.

The method of FIG. 5 also provides for a vehicle operating method, comprising: receiving road condition data to a controller; and increasing a boost amount by a predetermined boost amount in response to the road condition data via the controller, the predetermined boost amount based on a prior utilization of boost applied during a human driver's request to accelerate a vehicle. The method of claim 10, further comprising: adjusting the predetermined boost amount in response to a difference between an actual boost amount and a desired boost amount, the actual boost amount generated via increasing the boost amount by the predetermined boost amount. The method includes where the prior utilization of boost is determined via integrating an actual boost amount minus a desired boost amount. The method includes where increasing the boost amount includes closing a wastegate. The method further comprises adjusting the predetermined boost amount in response to an expected driver delay responding to the road condition and adapting the expected driver delay responding to the road condition responsive to a sum of a value of a previous state variable and accelerator pedal position. The method includes where the predetermined boost amount is determined as a function of vehicle speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
   increasing a boost amount by a predetermined boost amount via a controller in response to a change in a road condition determined via the controller, the predetermined boost amount based on an expected driver delay time determined via the controller, the expected driver delay time being an amount of time between the change in the road condition and a human driver reacting to the change in the road condition, wherein the expected driver delay time and predetermined boost amount are adapted based on the change in the road condition determined via the controller; and
   adjusting the predetermined boost amount via the controller in response to a difference between an actual boost amount and a desired boost amount, the actual boost amount generated via increasing the boost amount by the predetermined boost amount.

2. The method of claim 1, where the desired boost amount k a boost amount that is determined from accelerator pedal position.

3. The method of claim 1, where the change in the road condition includes traffic light switching time data.

4. The method of claim 1, where the change in the road condition includes data generated via a camera.

5. The method of claim 1, where the change in the road condition includes data generated via radio detection and ranging radar (RADAR) or a light detection and ranging system (LIDAR).

6. The method of claim 1, where the predetermined boost amount is determined as a function of vehicle speed.

7. The method of claim 6, where the predetermined boost amount is further determined as a function of a speed limit of a road a vehicle is traveling, the vehicle including the controller.

8. The method of claim 1, where the predetermined boost amount is further determined as a function of a speed of a second vehicle traveling in a path of a first vehicle, the first vehicle including the controller.

9. The method of claim 1, where adjusting the predetermined boost amount includes revising a value of the predetermined boost amount in controller memory.

10. A vehicle operating method, comprising:
    increasing a boost amount by a predetermined boost amount via a controller in response to a change in a road condition determined via the controller, the predetermined boost amount based on a prior utilization of boost applied during a human driver's request to accelerate a vehicle;
    adjusting the predetermined boost amount via the controller in response to an expected driver delay responding to the change in the road condition, the expected driver delay being an amount of time beginning at a time of the change in the road condition and ending when a human driver responds to the change in the road condition; and
    adapting the expected driver delay responding to the change in the road condition via the controller responsive to a sum of a value of a previous state variable and accelerator pedal position.

11. The method of claim 10, further comprising:
    adjusting the predetermined boost amount in response to a difference between an actual boost amount and a desired boost amount, the actual boost amount generated via increasing the boost amount by the predetermined boost amount.

12. The method of claim 10, where the prior utilization of boost is determined via integrating an actual boost amount minus a desired boost amount.

13. The method of claim 10, where increasing the boost amount includes closing a wastegate.

14. The method of claim 13, further comprising adjusting a boost command delay according to the expected driver delay.

15. The method of claim 10, where the predetermined boost amount is determined as a function of vehicle speed.

16. A vehicle system, comprising:
    an engine including a turbocharger and a wastegate;
    an accelerator pedal; and
    a controller including executable instructions stored in non-transitory memory to adjust a position of the wastegate as a function of an expected delay time of a driver responding to a change in a road condition, wherein the expected delay time of the driver and an adjustment amount determined via the controller;
    the expected delay time beginning at a time of the change in the road condition and ending with the driver applying the accelerator pedal.

17. The vehicle system of claim 16, further comprising additional instructions to increase a boost amount by a predetermined amount via the controller in response to the road condition.

18. The vehicle system of claim 17, where the predetermined amount is a function of vehicle speed and a road speed limit.

19. The vehicle system of claim 16, where changing the position of the wastegate includes closing the wastegate.

20. The vehicle system of claim 16, further comprising additional instructions to increase a boost amount by a predetermined boost amount in response to the change in the road condition via the controller, the predetermined boost amount based on a prior utilization of boost applied during a human driver's request to accelerate a vehicle.

* * * * *